(Model.)
A. THURSTON.
Meat-Press.
No. 227,860.                    Patented May 18, 1880.
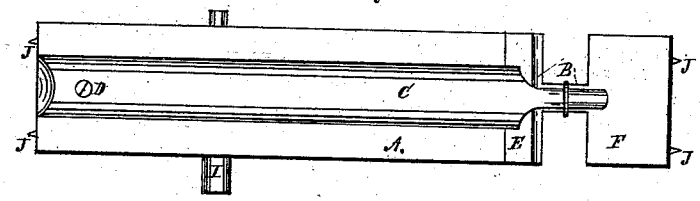
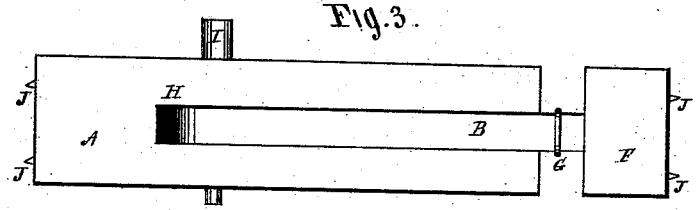
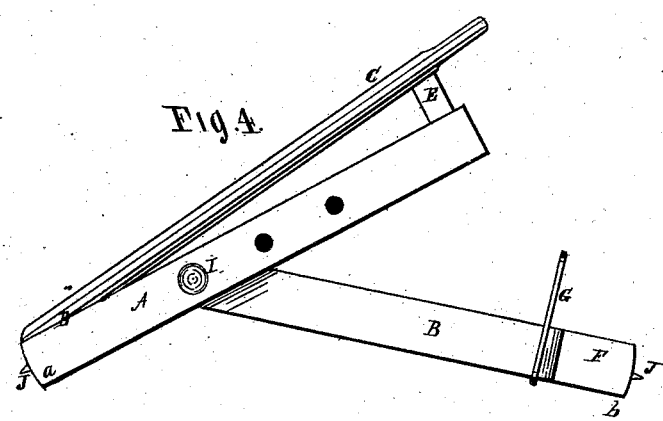
Witnesses.                          Inventor.

UNITED STATES PATENT OFFICE.

ADNAH THURSTON, OF OXFORD TOWNSHIP, ERIE COUNTY, OHIO, ASSIGNOR OF ONE-HALF OF HIS RIGHT TO CHARLES K. GAHEART, OF SAME PLACE.

MEAT-PRESS.

SPECIFICATION forming part of Letters Patent No. 227,860, dated May 18, 1880.

Application filed April 1, 1880. (Model.)

*To all whom it may concern:*

Be it known that I, ADNAH THURSTON, of Oxford township, in the county of Erie and State of Ohio, have invented a certain new and Improved Barreled Meat-Press; and I do hereby declare that the following is a full, clear, and complete description thereof, reference being had to the accompanying drawings.

The nature of this invention relates to an apparatus for pressing down the meat below the liquid brine in barrels. It may also be applied to pressing down vegetables below the pickle, and for other analogous purposes.

The apparatus or press consists of two arms jointed together in such way that the distance between the ends of the arms may be shortened by moving them toward each other and extended by a reverse movement. By this means the arms may be contracted or lengthened to enter the barrel, &c., and then extended so as to press down the meat or other article below the brine or pickle, as the case may be.

For a more full description, to enable others to understand the said invention, I will refer to the following specification, and to the annexed drawings, making a part thereof, in which—

Figure 1 is a side view of the apparatus or press. Fig. 2 is a top view. Fig. 3 is a view of the under side. Fig. 4 will be cited in the following description.

Like letters of reference refer to like parts in the several views.

The said press consists, in part, of two arms, A B. On the upper part of the arm A is secured a brace, C, Figs. 1 and 2, in an inclined position. One end of the brace is secured to the outer end of the arm A at D and the other end to the block E. Around the arm B, near the head F, is a loop, G, as seen in Figs. 1 and 3, this loop being of sufficient length to hook onto the outer end of the brace C, as seen in Figs. 1 and 2, for a purpose hereinafter shown.

The arm A is slotted or cut out at H, as shown in Fig. 3, to receive the arm B. In this position the two arms are jointed or pivoted together by the pin I. The length from *a* to *b* may be extended more or less, as the diameter of the barrel or other vessel may require, by means of the pin I inserted in the other holes in the arm A, as shown in Figs. 1 and 4.

In using the press the ends *a b* are moved toward each other, as seen in Fig. 4, thus shortening the distance between the two ends. It is then inserted in the barrel over the meat, when, on pressing down the upper arm to the position seen in Fig. 1, the distances between the ends of the two arms are elongated, as shown in Fig. 3. This elongation causes the spears or points J to be forced into the staves, which prevent the ends from rising by the pressure of meat or other article below the press in connection with the liquid in the barrel.

To prevent the press from being moved up at the jointed connection of the arms to the position seen in Fig. 4, which would allow the meat, &c., to float to the surface, the loop G is passed over the outer end of the handle or brace C, as shown in the drawings, which holds both arms firmly together, preventing either of the arms from turning or moving on the pin-joint at I.

Other devices may be used for hooking the loop, in place of the end of the handle.

It is well known that meat, fish, &c., when packed in liquid brine, rise to and above the surface of the liquid and become exposed to the atmosphere. The meat by this exposure becomes rusted or tainted, which renders it unfit for food. This is especially the case when the barrel is full, or nearly so, owing to the density of the brine and the buoyancy of the meat, causing the lower layers to force the upper layers out of the brine or pickle, as the case may be. The object of this improvement is not only to prevent upper layers of meat, &c., or single pieces in the barrel, from rising up out of the pickle, but to press the same down under the surface of liquor, which will prevent the injurious results upon the meat when exposed to the atmosphere.

The construction of the apparatus is such that it may be readily adjusted to various-sized barrels, &c., containing meats, vegetables, fish, &c., which are to be preserved in good condition, by submerging the articles below the surface of the liquor in which they are placed for preservation.

It is not uncommon to place stones and weights upon barrels above the barreled meat to force it below the surface of the brine. This method is extremely crude and inconvenient, it often occurring that these weights slip off and fall into the barrel with the meat. The improvement cited avoids this usual difficulty with comparatively little labor.

What I claim as my invention, and desire to secure by Letters Patent, is—

An improved press for barreled meat, consisting of the slotted arm A and arm B, jointed together, and loop G, arranged to hook onto the end of the handle or its equivalent, substantially as described, and for the purpose specified.

In testimony whereof I affix my signature in presence of two witnesses.

ADNAH THURSTON.

Witnesses:
J. H. BURRIDGE,
J. H. SURRNEY.